United States Patent [19]

Kuroda et al.

[11] 4,354,518

[45] Oct. 19, 1982

[54] DIAPHRAGM PISTON OPERATED VALVE DEVICE

[75] Inventors: Yoichi Kuroda; Hideo Tamamori, both of Kobe, Japan

[73] Assignee: Nippon Air Brake Co., Ltd., Kobe, Japan

[21] Appl. No.: 184,871

[22] Filed: Sep. 8, 1980

[51] Int. Cl.³ .............................................. G05D 11/00
[52] U.S. Cl. .................................................... 137/112
[58] Field of Search ................................. 137/112, 113

[56] References Cited

U.S. PATENT DOCUMENTS

| | | | |
|---|---|---|---|
| 2,311,851 | 2/1943 | McClure | 137/113 |
| 2,371,293 | 3/1945 | Hoof | 137/113 |
| 3,008,481 | 11/1961 | Matheson | 137/112 |
| 3,454,029 | 7/1969 | Fredd | 137/112 |

FOREIGN PATENT DOCUMENTS

| | | | |
|---|---|---|---|
| 1490561 | 8/1967 | France | 137/113 |
| 1395417 | 5/1975 | United Kingdom | 137/113 |

*Primary Examiner*—H. Jay Spiegel
*Attorney, Agent, or Firm*—George Patrick Baier

[57] ABSTRACT

A diaphragm type valve device comprising a housing having a pair of valve chambers separated by a diaphragm piston and connected to respective fluid pressure input ports, oppositely disposed valve seats fixed in the housing in facing relation to each side of the diaphragm piston and connected to respective output ports, a pair of valve members reciprocably disposed in a central bore in the diaphragm piston and being axially biased in opposite directions by a spring compressibly installed in the central bore between the valve members, one or the other of the valve members being seatable on one or the other of the valve seats when the diaphragm piston is axially displaced by dominating pressure acting on one or the other side thereof, and stop rings concentrically fixed in the central bore adjacent the respective ends thereof for limiting axial displacement of said valve members by the spring to a spaced-apart distance somewhat greater than the fixed axial distance between the valve seats. A spring for biasing the diaphragm toward one of the valve seats, if desired, may be compressibly disposed in one of the valve chambers between the diaphragm piston and an end wall of the housing.

8 Claims, 4 Drawing Figures

PRIOR ART

DIAPHRAGM PISTON OPERATED VALVE DEVICE

BACKGROUND OF THE INVENTION

The present invention is concerned with diaphragm operated valve devices involving the use of a diaphragm piston for alternatively switching delivery of fluid pressure between passageways conducting such fluids under pressure.

Such diaphragm type valve devices include, for example, a presently known form shown in FIG. 1 and labeled PRIOR ART. In this valve device, two valve chambers 1 and 2 separated by a diaphragm piston 3, are formed in a housing 4. Fluid under pressure may be supplied to valve chamber 1 from an input port 5 through a supply passageway 6, and fluid under pressure may be supplied to valve chamber 2 from an input port 7 through a supply passageway 8. Diaphragm piston 3 comprises a diaphragm 9 peripherally secured between two sections 10 and 11 of housing 4, and a piston follower 12 secured concentrically in the central portion of said diaphragm. Follower 12 carries valve members 13 and 14, one on each side thereof which, by axial movement of diaphragm 9, can be seated on oppositely facing valve seats 15 and 16 fixed in the respective sections 10 and 11 of housing 4. Valve seats 15 and 16 are open, respectively, to output ports 17 and 18. Upon supply of fluid under pressure to valve chambers 1 and 2 from passageways 6 and 8 through input ports 5 and 7, if the pressure of fluid in valve chamber 1, for example, is greater than the pressure of fluid in valve chamber 2, diaphragm piston 3 moves axially rightwardly, as viewed in FIG. 1, due to the pressure difference acting on the diaphragm piston, to seat valve member 14 on valve seat 16. Consequently, the connection between valve chamber 2 and output port 18 is cut off, and valve chamber 1 and output port 17 are connected. Fluid under pressure entering into valve chamber 1 with a higher pressure is discharged via output port 17 through a delivery passageway 19. When the pressure of fluid entering into valve chamber 2 is higher than that of fluid under pressure in valve chamber 1, the process opposite to that described above will occur so that fluid pressure is delivered via output port 18 and delivery passageway 19. In this way, of the fluids under pressure entering into the valve chambers 1 and 2 from the input ports 5 and 7, the fluid with the higher pressur will be delivered from one or the other of output ports 17 or 18 due to the switching of the diaphragm piston 3 induced by the pressure difference between the respective fluid pressures acting on the opposite sides thereof.

In such conventional valve devices, when diaphragm piston 3 is in the neutral position, in which it is shown in FIG. 1, valve chamber 1 connected to the input port 5 is connected to output port 17, and valve chamber 2 connected to input port 7 is connected to the output port 18. Therefore, when the fluid under pressure is fed very slowly into valve chambers 1 or 2 from input port 5 or 7 through the passageway 6 or 8, diaphragm piston 3 may not be moved sufficiently to seat one or the other of valve member 13 or 14 on valve seat 15 or 16, so that fluid under pressure flowing into valve chamber 1 or 2 may flow back to input port 5 or 7 from output port 17 or 18 through passageway 19 or 20, output port 17 or 18, and valve chamber 1 or 2. Consequently, axial movement of diaphragm piston 3 may be unduly delayed or not be accomplished at all.

SUMMARY OF THE INVENTION

The present invention was developed to overcome the problems mentioned above. It is concerned with valve devices involving the use of a diaphragm piston for switching fluid pressure delivery passageways conducting fluids under pressure. In these valve devices, movable valves which can be biased in the opposite directions away from each other by the action of a spring, are installed at the central portion of the diaphragm piston, and a latch portion for latching one or the other of the movable valves in a certain position, is also installed on the aforesaid diaphragm piston. When dominating fluid under pressure flowing in from one of the input ports causes the diaphragm piston to be switched from its neutral position to a supply position, one of the movable valves is always seated on the adjacent valve seat to prevent fluid under pressure flowing in from the input port on the high pressure side from flowing back into the input port on the low pressure side.

DESCRIPTION AND OPERATION

Figure 1:
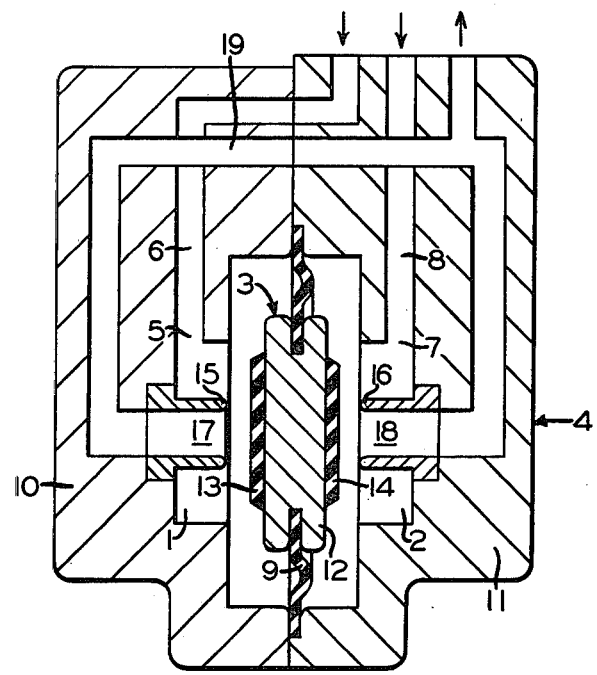
FIG. 1 is a sectional view showing a presently known form of a diaphragm type valve device.
Figure 2:
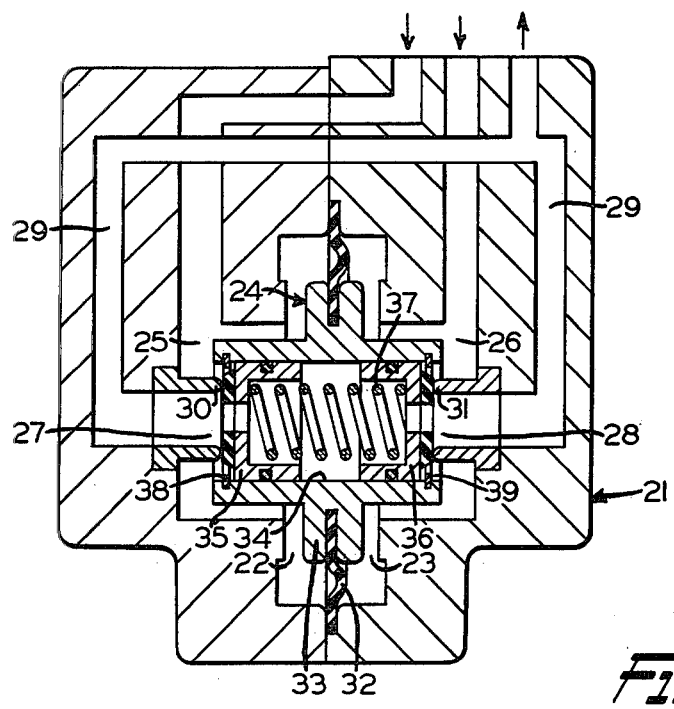
FIG. 2 is a sectional view showing a diaphragm type valve device embodying the present invention.

The present invention will be explained according to the actual examples shown in FIGS. 2, 3, and 4. As shown in FIG. 2, a housing 21 has a pair of valve chambers 22 and 23 formed therein and separated by a diaphragm piston 24. A pair of input ports 25 and 26 are connected to valve chambers 22 and 23, respectively. Valve chambers 22 and 23 are also communicable with output ports 27 and 28, respectively. Output ports 27 and 28 are connected to each other via a delivery passageway 29. Respective valve seats 30 and 31 are fixed in housing 21 in oppositely facing relation to each other and in surrounding relation to output ports 27 and 28, respectively.

The aforesaid diaphragm piston 24 comprises a diaphragm 32, peripherally secured between two sections of housing 21, and a follower 33. A bore 34 extends coaxially through follower 33 and opens at each end to output ports 27 and 28. Two cup-shaped, piston type valve members 35 and 36 are reciprocably disposed in bore 34 with a compression spring 37 compressibly disposed therebetween. Stop rings 38 and 39 are fixed in bore 34 adjacent each end thereof, and are axially spaced apart at such a distance that when the two valve members 35 and 36 are fully extended apart by spring 37 to make contact with the stop rings 38 and 39, respectively, the maximum distance between the two valve members is somewhat less than the distance between the valve seats 30 and 31.

The operation of the valve device embodying the present invention and as shown in FIG. 2, will be presently described. Upon supply of fluid under pressure entering valve chambers 22 and 23 from input ports 25 and 26, if the pressure in valve chamber 23 is higher than that in valve chamber 22, diaphragm piston 24 will move to the left, as shown in FIG. 3, due to the pressure difference acting thereon. Therefore, valve member 35 on the left side, as shown in FIG. 3, will be seated on valve seat 30 by action of spring 37 to shut off the connection between output port 27 and valve chamber 22. Valve member 36 on the right side is contacted and picked up by stop ring 39 at the right end of bore 34, thus moving said valve member, together with diaphragm piston 24 against opposition of spring 37, toward the left, as viewed in FIG. 3, to unseat said valve member from valve seat 31. Consequently, output port 28 and valve chamber 23 will be communicated with each other, and fluid at a higher pressure flowing into valve chamber 23 from input port 26 will be delivered via output port 28 and delivery passageway 29. If the pressure of fluid entering valve chamber 22 is higher than that of the fluid in valve chamber 23, operation of the valve device is opposite to that above described.

Figure 3:
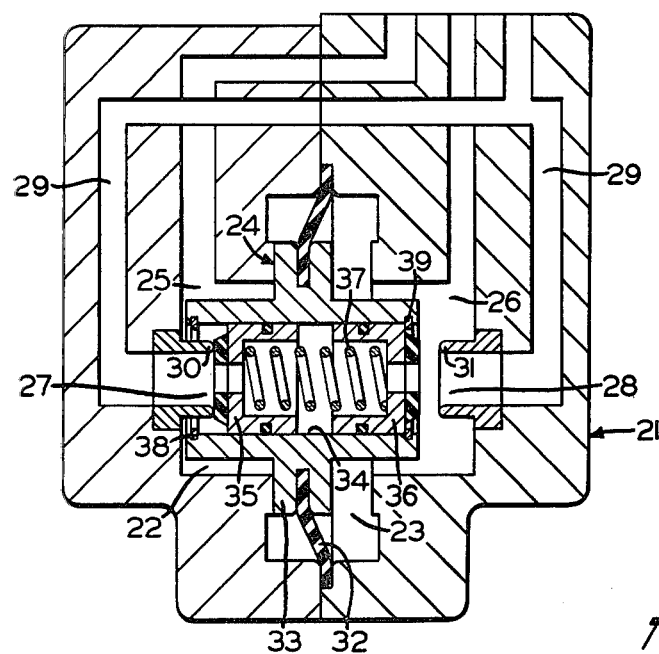
FIG. 3 is a sectional view showing the valve device shown in FIG. 2 in one operational state.

In the valve device shown in FIG. 3, when fluid under pressure is fed very slowly into valve chamber 23, for example, from input port 26, valve member 36 will move to the left together with diaphragm piston 22, and valve chamber 23 will be connected to the output port 28. However, valve member 35 is normally seated on valve seat 30 (as is valve member 36 on seat 31, in the absence of fluid pressure in chambers 22 and 23, by the action of spring 37) to shut off communication between valve chamber 22 and output port 27 even though diaphragm piston 22 has moved leftwardly from its neutral position (see FIGS. 2 and 3). Therefore, fluid at the higher pressure prevailing at input port 26 cannot flow back to valve chamber 22 and input port 25, which have the lower pressure, from output port 27 through valve chamber 22, output port 28, and passageway 29. In this way, the fluid at the higher pressure can be discharged precisely. When fluids at the same pressure are fed into valve chambers 22 and 23 from input ports 25 and 26, respectively, diaphragm piston 22 will remain in its neutral position, but valve members 35 and 36 will be moved away and unseated from valve seats 30 and 31 against the action of the spring 37, due to the action of the fluids under pressure on said valve members to connect valve chamber 22 to output port 27 and chamber 23 to output port 28. The fluid under pressure from the input ports 25 and 26 will be delivered via output ports 27 and 28 through delivery passageway 29.

Figure 4:
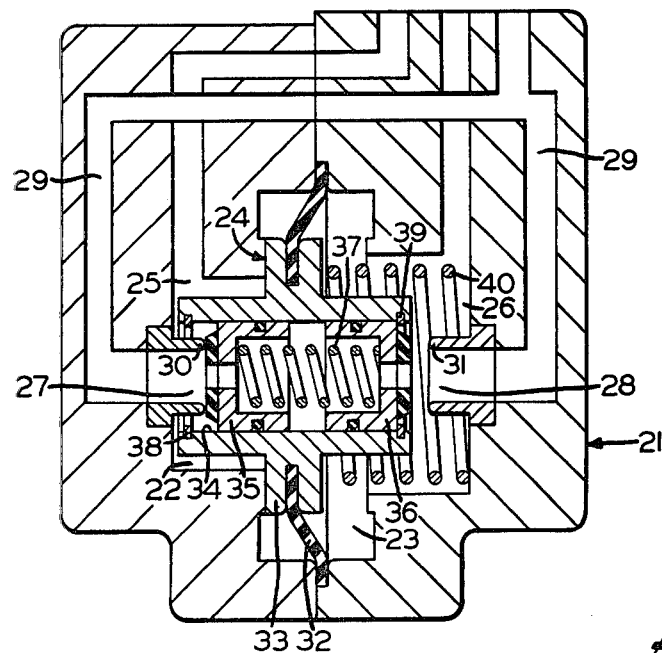
FIG. 4 is a sectional view of a modification of the valve device shown in FIG. 2.

The valve device shown in FIG. 4 includes a modification to the present invention. This valve device is the same as the one shown in FIG. 2 and described above, except that a spring 40 for axially biasing diaphragm piston 22 in one direction, is compressibly disposed in one of the valve chambers 22 or 23. In this case, spring 40 is installed in valve chamber 23, compressed between follower 33 of piston 22 and the facing end wall of housing 21 so that valve member 35 is biased toward a seated position on valve seat 30. With leftward movement of piston 22, valve member 36 is engaged by stop ring 39 and together with the diaphragm piston 22, thereby unseating said valve member from valve seat 31 so as to connect output port 28 to valve chamber 23. In other words, in this valve device presently being described, fluid under pressure flowing into valve chamber 23 from input port 26 is delivered via output port 28 through delivery passageway 29 in preference to having fluid under pressure flowing into valve chamber 22 from input port 25. In this case, notwithstanding that the pressure in the valve chamber 22 is higher than that in the valve chamber 23, fluid under pressure from input port 26 will be delivered preferentially via output port 28 until the pressure difference becomes equivalent to the force of spring 40. When the sum of the forces of fluid pressure flowing into valve chamber 23 from the input port 26 for biasing piston 22 to the left and the force of spring 40 for also biasing piston 22 to the left, is less than the force of fluid pressure flowing into valve chamber 22 from input port 25 for biasing piston 22 to the right, said piston 22 will move to the right, as viewed in FIG. 4, so as to cause valve member 36 to be seated on valve seat 30 and thus cut off the connection between valve chamber 23 and output port 27. At the same time, valve member 35 will be engaged by stop ring 38 and will be moved to the right together with piston 22, as viewed in FIG. 4, so as to be unseated from valve seat 30. Therefore, valve chamber 22 and output port 27 will be connected with each other, and the fluid at a higher pressure will be delivered via output port 27 and delivery passageway 29. At this moment, since valve member 36 is seated on valve seat 31, fluid at the higher pressure will not flow back to valve chamber 23 and to input port 26, which have the lower pressure. When the two input ports 25 and 26 are both opened to atmosphere, piston 22 will be moved to the left by the action of the spring 40, as shown in FIG. 4, to connect valve chamber 23 to output port 28. Consequently, devices, such as external pipes and valves (not shown in the figure) connected to passageway 29 will also be opened to atmosphere through said passageway 29, output port 28, valve chamber 23, and input port 26.

It should be apparent from the above description that in the valve device embodying the present invention, when fluid under pressure is fed into the valve chambers from the input ports to cause axial movement of the diaphragm piston, one of the valve members is always seated on the adjacent valve seat while the other valve member is unseated from the other valve seat to effect delivery of fluid under pressure. Therefore, fluid from the input port with the higher pressure will never flow back to the input port with the lower pressure. Switching or axial movement of the diaphragm piston can be achieved accurately so that operational errors and switching failures can be prevented. Moreover, although the diaphragm piston may not switch due to the fact that the pressure of the fluids under pressure fed from the input ports into the valve chambers on both sides of the film plate piston are the same, fluid under pressure can still be delivered from the output port past the valve member to prevent possible failure of fluid feeding.

Having thus described the invention what we claim as new and desire to secure by Letters Patent, is:

1. A diaphragm piston operated valve device comprising:
   (a) a housing having a pair of valve chambers formed therein and open to respective fluid pressure input ports;
   (b) a diaphragm piston operably disposed in said housing between and separating said chambers, and being subjected on opposite sides to the respective pressures prevailing in the chambers,
   (c) a pair of oppositely disposed piston type valve members operably connected to said diaphragm piston;
   (d) a pair of oppositely facing valve seats fixed in said housing, each opening to a common fluid pressure delivery passageway;

(e) a spring member compressibly disposed between said valve members which biases the valve members in axially opposite directions to a neutral position in which the valve members are simultaneously seated on the valve seats, respectively, to cut off communication between the valve chambers and the delivery passageway, (f) said diaphragm piston being effective, when the pressure in one of said chambers is greater than that in the other chamber, for operating one valve member to a seated position on the adjacent valve seat and for operating the other valve member to an unseated position, relative to its adjacent valve seat, in which unseated position communication is established between the adjacent chamber and said delivery passageway.

2. A diaphragm piston operated valve device, as set forth in claim 1, wherein said valve members are open to and subjected to the prevailing pressures in the respective adjacent chambers and are concurrently operable to unseated positions relative to the valve seats, respectively, for communicating both chambers concurrently to said delivery passageway when the respective pressures in said chambers are substantially equal and sufficient for overcoming the opposing force of said spring member.

3. A diaphragm piston operated valve device, as set forth in claim 1, wherein said diaphragm piston includes a follower member concentrically secured in and movable with the diaphragm piston, said follower having coaxially extending therethrough a central bore in which said valve members are reciprocably disposed.

4. A diaphragm piston operated valve device, as set forth in claim 3, wherein said follower member has concentrically secured in said bore adjacent each end thereof a stop ring, each ring being engageable with the respective adjacent valve member, upon axial movement of the diaphragm piston in an axial direction away from the respective adjacent valve seat, for moving said valve member with said follower in the same axial direction away from said respective adjacent valve seat.

5. A diaphragm piston operated valve device, as set forth in claim 4, wherein said stop rings are fixed in said central bore at an axially spaced-apart distance somewhat less than the fixed axial distance between the valve seats.

6. A diaphragm piston operated valve device, as set forth in claim 5, wherein the particular valve member, when engaged and axially moved by the adjacent stop ring upon movement of said follower member and said diaphragm piston in an axial direction away from the particular respective adjacent valve seat, is moved axially away from the particular respective adjacent valve seat, and, acting through the displacement of said spring forcibly urges the other of said valve members into engagement with the respective other adjacent valve seat.

7. A diaphragm piston operated valve device, as set forth in claim 1, characterized by a second spring member compressedly disposed in one of said chambers between the adjacent side of the diaphragm piston and a facing end wall of the housing, said second spring member being effective for normally maintaining the adjacent valve member in its unseated position until such time as pressure acting on the side opposite said adjacent side is sufficient for overcoming the combined opposing forces of said first-mentioned spring member and said second spring member.

8. A diaphragm piston operated valve device comprising a housing having a pair of valve chambers separated by a diaphragm piston and open to respective fluid pressure input ports, oppositely disposed valve seats fixed in the housing in facing relation to each side of the diaphragm piston and open to respective output ports, a pair of valve members operably interposed between the import ports and output ports, respectively, in a central bore formed in a diaphragm follower of the diaphragm piston, said valve members being biased in axially opposite directions to respective seated positions on the valve seats by a spring compressibly interposed in the central bore between the two valve members, one or the other of the valve members being seatable on one or the other of the valve seats when the diaphragm piston is axially displaced by dominating pressure acting on one or the other side thereof, and stop rings concentrically fixed in the central bore adjacent the respective ends thereof which limit axial displacement of said valve members to a spaced-apart distance somewhat greater than the fixed axial distance between the valve seats so as to allow simultaneous seating of said valve members on their respective seats in a neutral position of the valve device, one or the other of said stop rings being engageable with the respective valve member, depending upon the direction of axial movement of the diaphragm piston, for moving the engaged valve member axially away from its adjacent valve seat.

* * * * *

UNITED STATES PATENT AND TRADEMARK OFFICE
CERTIFICATE OF CORRECTION

PATENT NO. : 4,354,518
DATED : October 19, 1982
INVENTOR(S) : Yoichi Kuroda & Hideo Tamamori It is certified that error appears in the above-identified patent and that said Letters Patent are hereby corrected as shown below:

Column 6, line 28, delete "import" and insert --input--

Signed and Sealed this

Twelfth Day of July 1983

[SEAL]

*Attest:*

GERALD J. MOSSINGHOFF

*Attesting Officer*   *Commissioner of Patents and Trademarks*